United States Patent
Fröböse

(10) Patent No.: US 10,155,257 B2
(45) Date of Patent: Dec. 18, 2018

(54) FEED DRIVE FOR A COLD PILGERING MILL

(75) Inventor: Thomas Fröböse, Versmold (DE)

(73) Assignee: Sandvik Materials Technology Deutschland GmbH, Düsseldorf (DE)

(*) Notice: Subject to any disclaimer, the term of this patent is extended or adjusted under 35 U.S.C. 154(b) by 1075 days.

(21) Appl. No.: 13/319,610

(22) PCT Filed: May 5, 2010

(86) PCT No.: PCT/EP2010/056112
§ 371 (c)(1),
(2), (4) Date: Feb. 3, 2012

(87) PCT Pub. No.: WO2010/130613
PCT Pub. Date: Nov. 18, 2010

(65) Prior Publication Data
US 2012/0125066 A1 May 24, 2012

(30) Foreign Application Priority Data
May 15, 2009 (DE) .................. 10 2009 003 175

(51) Int. Cl.
*B21B 19/06* (2006.01)
*B21B 21/04* (2006.01)
(Continued)

(52) U.S. Cl.
CPC ............ *B21B 21/045* (2013.01); *B21B 21/00* (2013.01); *B21B 21/02* (2013.01); *B21B 21/04* (2013.01);
(Continued)

(58) Field of Classification Search
CPC ....... B21B 21/02; B21B 21/00; B21B 21/005; B21B 21/04; B21B 21/045; B21B 21/06; B21B 21/065; B21B 37/78; F16D 63/008
(Continued)

(56) References Cited

U.S. PATENT DOCUMENTS

| 67,993 A | 8/1867 | Loomis |
|---|---|---|
| 259,434 A | 6/1882 | Stockwell |

(Continued)

FOREIGN PATENT DOCUMENTS

| DE | 853138 | 7/1949 |
|---|---|---|
| DE | 24 01 354 | 8/1975 |

(Continued)

OTHER PUBLICATIONS

Machine translation of DE3823134.*
International Search Report for PCT/EP2010/056112.
German Search Report dated Aug. 17, 2009.

*Primary Examiner* — David B Jones
(74) *Attorney, Agent, or Firm* — Morgan, Lewis & Bockius LLP

(57) ABSTRACT

The state of the art discloses cold rolling mills comprising a roll stand, at least one roll rotatably mounted to the roll stand, a feed clamping saddle for feeding a blank, and a first drive for the feed clamping saddle. Those cold rolling mills have ball spindle drives with a high rate of wear as the drive for the feed clamping saddle. In comparison the object of the present invention is to provide a cold rolling mill whose drive for the feed clamping saddle involves no or only very slight wear and which in addition permits a slow movement of the feed clamping saddle. According to the invention that object is attained by a cold rolling mill which has a direct electromechanical linear drive for the feed clamping saddle.

9 Claims, 3 Drawing Sheets

Figure 1:
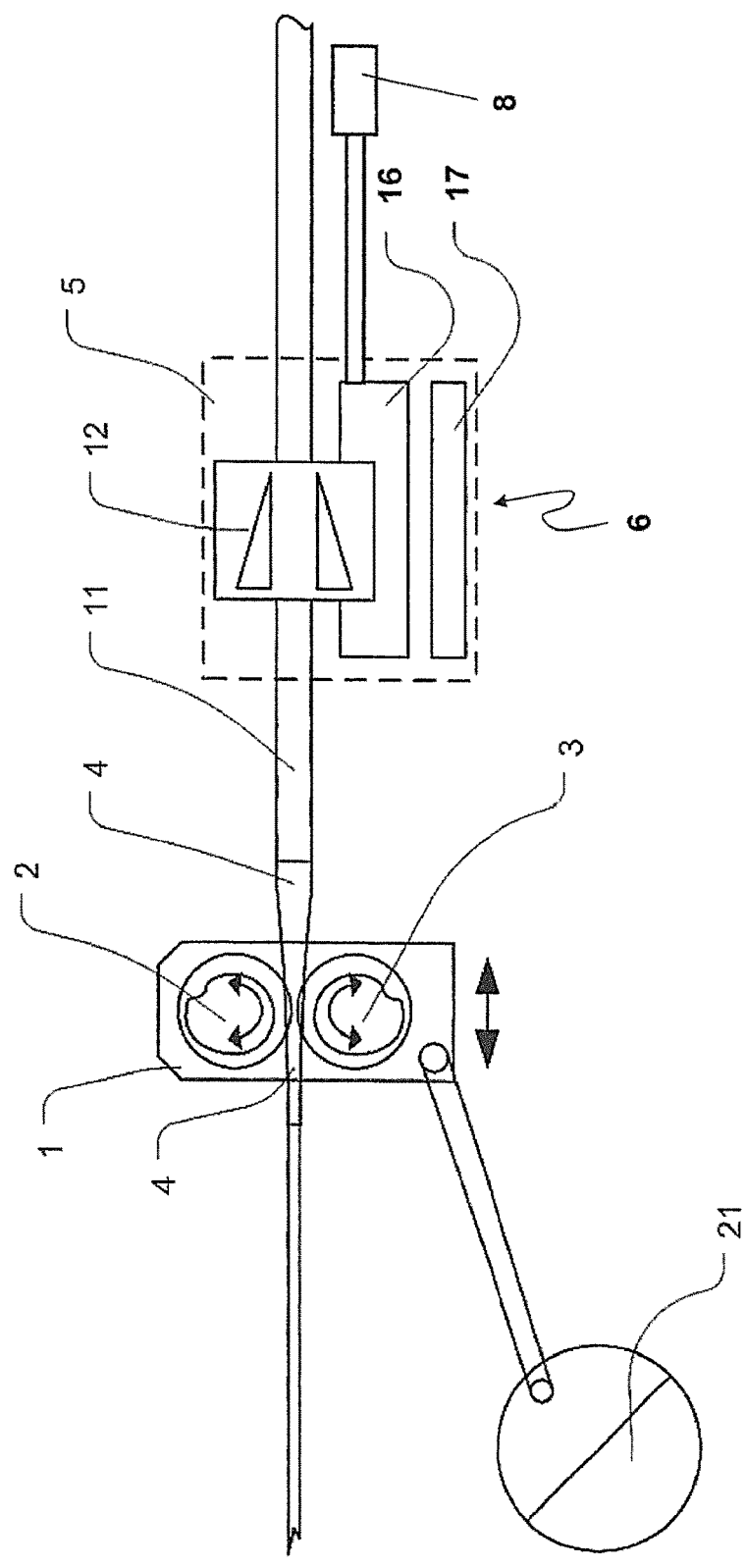

(51) Int. Cl.
  *B21B 21/06* (2006.01)
  *B21B 21/02* (2006.01)
  *B21B 37/78* (2006.01)
  *B21B 21/00* (2006.01)
  *F16D 63/00* (2006.01)

(52) U.S. Cl.
  CPC .............. *B21B 21/06* (2013.01); *B21B 37/78* (2013.01); *F16D 63/008* (2013.01); *B21B 21/005* (2013.01); *B21B 21/065* (2013.01)

(58) Field of Classification Search
  USPC ....... 72/28.2, 29.1, 430, 208, 209, 214, 199, 72/220, 249, 250
  See application file for complete search history.

(56) References Cited

U.S. PATENT DOCUMENTS

| | | | |
|---|---|---|---|
| 637,772 A | 11/1899 | Eilers | |
| 2,430,761 A | 11/1947 | Duphily | |
| 3,584,489 A | 6/1971 | Peytavin | |
| 3,688,540 A | 9/1972 | Russel | |
| 3,698,225 A * | 10/1972 | Peytavin | 72/208 |
| 3,948,070 A | 4/1976 | Hentzschel et al. | |
| 4,019,394 A * | 4/1977 | Peytavin | B21B 21/045 72/214 |
| 4,037,444 A | 7/1977 | Ledebur et al. | |
| 4,090,386 A | 5/1978 | Naylor et al. | |
| 4,154,079 A * | 5/1979 | Peytavin | 72/214 |
| 4,233,834 A * | 11/1980 | Matinlassi | 72/208 |
| 4,407,438 A * | 10/1983 | Wiechmann | 226/15 |
| 4,577,483 A * | 3/1986 | Rehag | B21B 21/045 226/112 |
| 4,641,513 A | 2/1987 | Peytavin | |
| 4,655,068 A * | 4/1987 | Schemel | 72/208 |
| 4,658,617 A * | 4/1987 | Peytavin | B21B 21/005 72/208 |
| 4,743,216 A | 5/1988 | Chen et al. | |
| 4,930,328 A | 6/1990 | Duerring | |
| 5,419,173 A * | 5/1995 | Baensch | B21B 21/045 72/214 |
| 5,540,076 A | 7/1996 | Baensch et al. | |
| 6,012,313 A * | 1/2000 | Persico | 72/10.4 |
| 6,469,409 B1 * | 10/2002 | Takada | 310/77 |
| 6,591,757 B1 * | 7/2003 | Rajaraman | B23Q 5/28 104/290 |
| 6,688,152 B2 * | 2/2004 | Klingen et al. | 72/291 |
| 7,719,168 B2 * | 5/2010 | Morel | 310/328 |
| 7,992,417 B2 * | 8/2011 | Hayashi | 72/208 |
| 8,191,391 B2 | 6/2012 | Baensch | |
| 2004/0045334 A1 * | 3/2004 | Baensch | 72/214 |
| 2004/0173001 A1 | 9/2004 | Stinnertz et al. | |
| 2008/0224548 A1 * | 9/2008 | Morel | F16D 63/008 310/12.31 |
| 2012/0139195 A1 | 6/2012 | Froböse | |
| 2013/0186214 A1 | 7/2013 | Froböse | |

FOREIGN PATENT DOCUMENTS

| | | |
|---|---|---|
| DE | 38 23 134 | 4/1989 |
| DE | 3823134 | 4/1989 |
| DE | 44 19 827 | 12/1994 |
| EP | 1034852 | 9/2000 |
| GB | 1136195 | 4/1969 |
| SU | 770579 | 7/1978 |

* cited by examiner

FEED DRIVE FOR A COLD PILGERING MILL

RELATED APPLICATIONS

The present application is a U.S. National Phase Application of International Application No. PCT/EP2010/056112 (filed 5 May 2010) which claims priority to German Application No. 10 2009 003 175.8 (filed 15 May 2009).

The present invention concerns a cold rolling mill comprising a roll stand, at least one roll rotatably mounted to the roll stand, a feed clamping saddle for feeding a blank, and a first drive for the feed clamping saddle.

The invention further concerns a method of operating a cold rolling mill.

To produce precise metal tubes, in particular of steel, an expanded hollow-cylindrical blank is cold reduced in the completely cold condition by pressure stresses. In that case the blank is converted to the form of a tube of defined reduced outside diameter and defined wall thickness.

The most wide-spread reducing method for tubes is known as cold pilgering, the blank being referred to as the tube shell. In the rolling operation the tube shell is pushed over a rolling mandrel which is calibrated, that is to say which is of the inside diameter of the finished tube, and in that situation is embraced from the outside by two rolls which are calibrated, that is to say which define the outside diameter of the finished tube, and is rolled out in the longitudinal direction over the rolling mandrel.

During cold pilgering the tube shell experiences a stepwise feed in a direction towards the rolling mandrel or beyond same, while the rolls are horizontally reciprocated rotatingly over the mandrel and thus the tube shell. In that case the horizontal movement of the rolls is predetermined by a roll stand to which the rolls are rotatably mounted. In known cold pilger rolling mills the roll stand is reciprocated by means of a crank drive in a direction parallel to the rolling mandrel while the rolls themselves receive their rotary movement from a rack which is stationary relative to the roll stand and into which engage gears which are fixedly connected to the roll shafts.

The feed of the tube shell over the mandrel is effected by means of a feed clamping saddle which permits a translatory movement in a direction parallel to the axis of the rolling mandrel.

The conically calibrated rolls arranged in mutually superposed relationship in the roll stand rotate in opposite relationship to the feed direction of the feed clamping saddle. The so-called pilger mouth formed by the rolls engages the tube shell and the rolls push a small wave of material away from the outside, the wave being stretched out by the smoothing caliber of the rolls and the rolling mandrel to afford the intended wall thickness until the clearance caliber of the rolls releases the finished tube. During the rolling operation the roll stand with the rolls mounted thereto moves in opposite relationship to the feed direction of the tube shell. After reaching the clearance caliber of the rolls the tube shell is fed by means of the feed clamping saddle by a further step towards the rolling mandrel while the rolls with the roll stand move back into their horizontal starting position. At the same time the tube shell experiences a rotation about its axis to achieve a uniform shape for the finished tube. Rolling over each tube portion a plurality of times provides a uniform wall thickness and roundness for the tube and uniform inside and outside diameters.

While as described above the horizontal reciprocating movement of the roll stand is effected by means of a crank drive the linear feed of the feed clamping saddle is achieved by means of a ball spindle drive in the known cold pilger rolling mills. In that case the ball spindle drive comprises a servomotor, a transmission, a trapezoidal threaded spindle with associated mounting points and suitable lubrication as well as a trapezoidal thread spindle nut. The servomotor is connected by way of a coupling to the transmission and by way of a further coupling to the trapezoidal threaded spindle itself. The rotary movement of the threaded spindle is converted into a translatory movement by means of the trapezoidal thread spindle nut. In that case the trapezoidal thread spindle nut is connected to the feed clamping saddle so that, upon rotation of the spindle, the spindle nut and therewith the feed clamping saddle are moved with a translatory movement towards the rolling mandrel. To guide the feed clamping saddle, guide rails are provided in addition to the spindle drive, the guide rails predetermining the direction of translatory movement of the feed clamping saddle.

A precise and controlled stepwise feed is indispensable for producing precisely manufactured tubes. In the state of the art therefore a spindle drive with a low transmission ratio is adopted, which in turn permits precise positioning of the feed clamping saddle in the translatory direction. The low transmission ratio for the spindle drive however involves a play. That play however leads to increased wear of the spindle drive so that at regular intervals the entire spindle drive or at least parts thereof have to be replaced. That replacement involves high mounting and spare part costs, while the stoppage times of the rolling mill also have to be taken into consideration as consequential costs.

In addition the great play which is linked to the low transmission ratio of the spindle drive means that the feed clamping saddle cannot be moved slowly. Such a slow displacement of the feed spindle saddle however is absolutely necessary for cold pilgering of tubes of small nominal diameters as otherwise that results in irregularities in the production of those tubes of small diameters.

Having that background in mind the object of the present invention is to provide a cold rolling mill whose drive for the feed clamping saddle involves no or only very slight wear and which in addition permits slow displacement of the feed clamping saddle.

According to the invention that object is attained by a cold rolling mill comprising a roll stand, at least one roll rotatably mounted to the roll stand, a feed clamping saddle for feeding a blank, and a first drive for the feed clamping saddle, wherein the first drive has a direct electromechanical linear drive.

The term electromechanical linear drive in accordance with the present invention is used to denote all linear motors and linear actuators which without conversion of a rotary movement into a translatory movement permit a suitable displacement travel and adequate positioning accuracy. Besides linear motors with the electrodynamic operating principle these are linear actuators involving the piezoelectric, electrostatic, electromagnetic, magnetrestrictive or thermoelectroelectrical operating principle.

Such a direct electromechanical linear drive, in particular a linear motor, has the advantage that it works directly on the feed clamping saddle and also operates in contact-less mode and thus almost completely in wear-free fashion.

The feed forces are applied to the feed clamping saddle directly by the linear drive. Conversion of the rotary movement of the servo drive into a translatory movement by way of transmission, spindle and spindle nut is eliminated. Thus the number of mechanical components is also markedly reduced, which inter alia reduces the costs involved in the storage of spare parts.

Linear drives can be constructed in a very compact structure and therefore reduce the structural size of the entire rolling mill in comparison with a conventional spindle drive.

Any displacement travels can be implemented by means of the direct electromechanical linear drive, both with short and also with long displacement steps.

Modern cold pilger rolling mills require about 300 feed steps per minute so that high demands are made on the drive of the feed clamping saddle, in terms of acceleration, deceleration and the feed speed. Those demands can be well met by a direct electromechanical linear drive. In addition the feed per feed step is only about 3 mm so that a high level of positional accuracy of the drive is required, which can be reproducibly achieved with a direct electromechanical linear drive.

In an embodiment of the invention the cold rolling mill is a cold pilger rolling mill having a calibrated rolling mandrel and at least two calibrated rolls rotatably mounted to the roll stand, wherein the cold rolling mill has a second drive for the roll stand which reciprocates the roll stand during the rolling process in the feed direction of the feed clamping saddle and wherein the cold rolling mill has a third drive which rotates the feed clamping saddle and therewith the tube shell about an axis parallel to the feed direction during the rolling process.

In a further embodiment the first drive for the feed clamping saddle has at least two electromechanical linear drives. That provides ideal application of force to the feed clamping saddle in the translatory direction so that it can move without tilting relative to the guides in the translatory direction.

In an embodiment the direct electromechanical linear drive is a linear motor with stator and rotor which is also referred to as a travelling field machine. While the stator is arranged along the displacement path of the feed clamping saddle the rotor is fixed to the feed clamping saddle itself so that the magnetic field which moves along the stator pulls the rotor and therewith the feed clamping saddle along the displacement path.

The known direct electromechanical linear drives, in particular linear motors, are capable of transmitting high forces to the rotor and the elements connected thereto, in the present invention the feed clamping saddle, dynamically, that is to say when the rotor is in motion. In the static situation, that is to say when the rotor is not moving relative to the stator however, those forces rapidly fall. In order nonetheless to be able to absorb the forces acting on the tube shell and forces transmitted therefrom to the feed clamping saddle in the cold rolling operation during engagement of the rolls, it is therefore advantageous if the first drive for the feed clamping saddle has a brake (8 in FIG. 1), in particular a locking brake, for preventing a translatory movement of the feed clamping saddle. That serves for fixing the saddle in the static condition of the direct electromagnetic linear drive.

Examples of such a brake for receiving the forces which act on the feed clamping saddle in the static condition are a mechanical braking system in the manner of a drum or disk brake, a latching arrangement in the manner of a mechanical latch or also a damping pneumatic or hydraulic system which at least prevents movement of the saddle in a translatory direction.

In particular an advantageous embodiment of the invention is one in which the brake prevents a translatory movement of the feed clamping saddle in a direction in opposite relationship to the feed direction as in that direction, because of the direction of rotation of the rolls on the roll stand in the static condition the greatest forces are exerted on the tube shell or the feed clamping saddle.

In an embodiment of the invention the brake for the feed clamping saddle is a reverse-motion brake for preventing a movement of the feed clamping saddle in a direction opposite to the feed direction.

In a further embodiment of the invention the feed clamping saddle has a guide which is an electromagnetic linear guide, as is used for example for magnetic rail vehicles. In that way both the drive for the feed clamping saddle and also the guide means thereof can be of a contact-less nature, which almost completely eliminates the wear of the feed system.

In a further embodiment of the invention the second drive for the roll stand also has a direct electromechanical linear drive, as was described above. In that way the translatory movement of the roll stand to and fro parallel to the axis of the rolling mandrel can also be embodied in wear-free manner with the above-indicated advantages.

In an embodiment of the invention the individual movements of the feed clamping saddle (feed and rotation of the tube shell) as well as the forward and backward movement of the roll stand are implemented with drives which are firstly independent of each other. It is therefore advantageous in an embodiment to provide a control which so controls the individual drives that the rolling process, as was described hereinbefore in this application for the state of the art, can be performed on the mill, in which case the drives are actuated individually and at the correct moment in time.

The aforementioned object is also attained by a method of cold rolling a blank by means of at least one roll, wherein the blank is fed in the direction of the roll and wherein the feed is implemented by means of a direct electromagnetic linear drive.

In that respect a desirable embodiment is one in which the blank is fed stepwise, wherein between the feed steps a translatory movement of the blank in a second direction opposite to the first direction is prevented.

Further advantages, features and possible uses of the present invention are clearly apparent from the description hereinafter of a preferred embodiment and the associated Figures.

Figure 2:
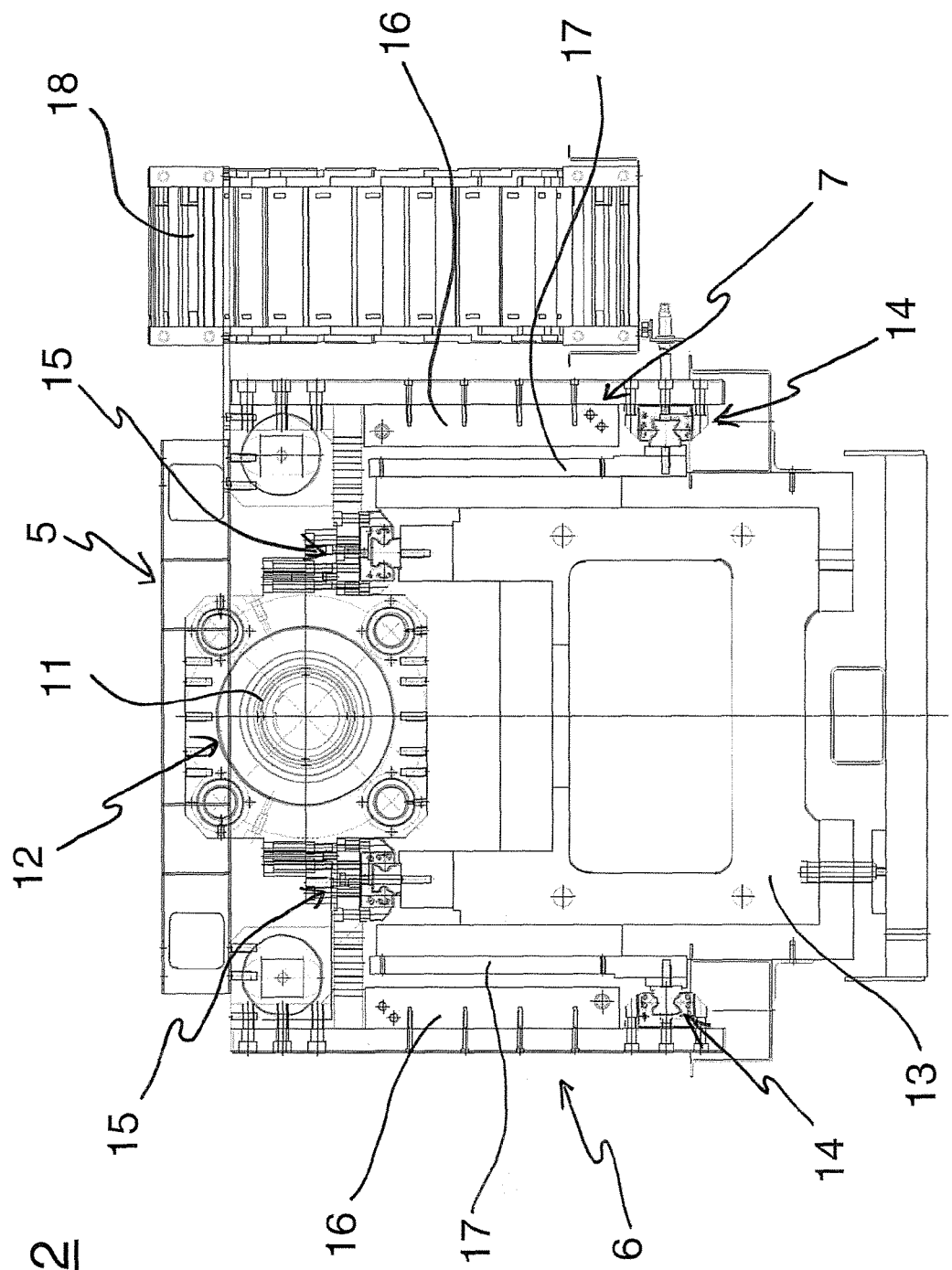
Figure 3:
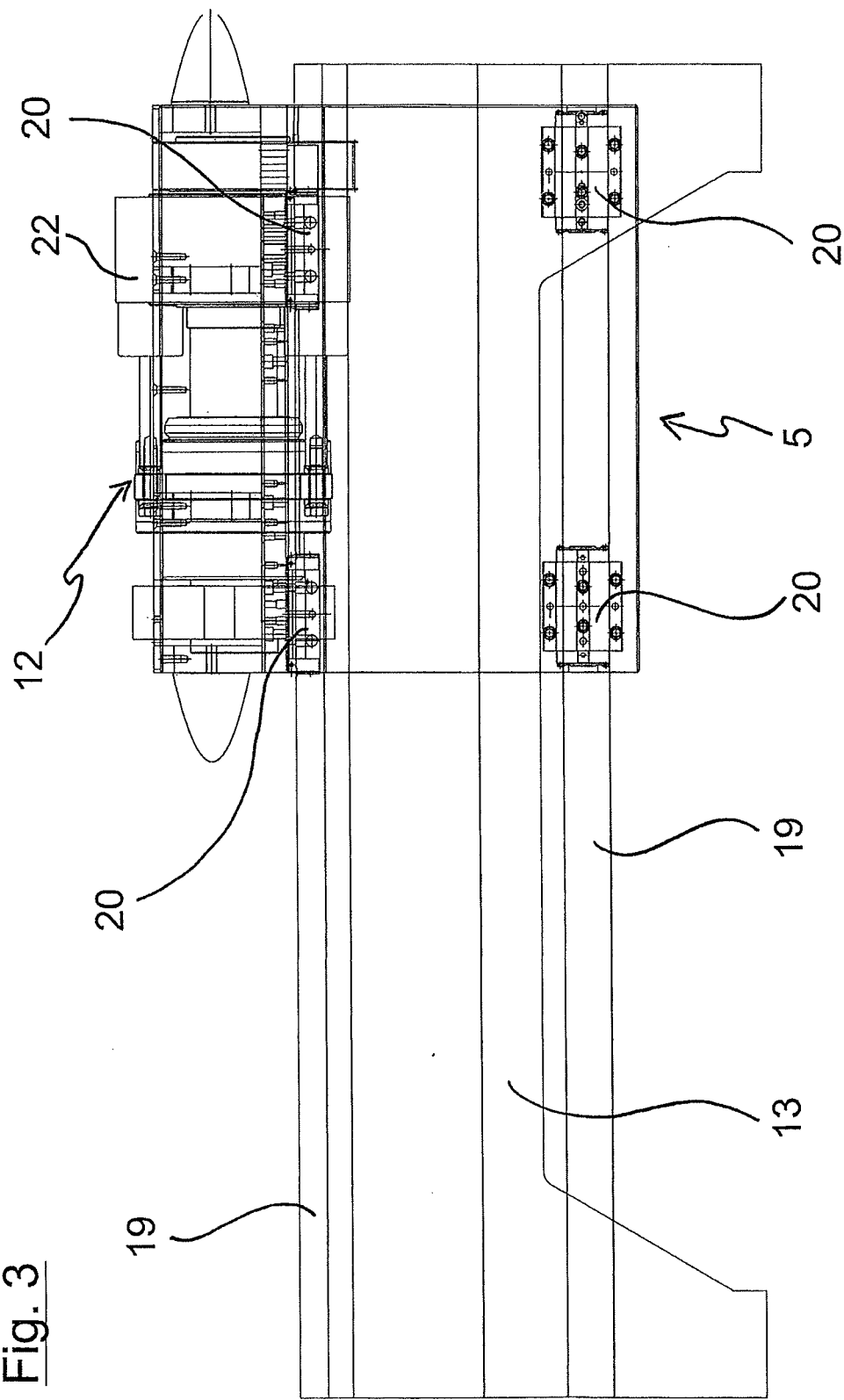

FIG. 1 shows a side view of the diagrammatic structure of a cold pilger rolling mill according to an embodiment of the present invention, FIG. 2 shows a side view in the transverse direction of the feed clamping saddle of a cold pilger rolling mill according to an embodiment of the present invention, FIG. 3 shows a longitudinal section through the feed clamping saddle of a cold pilger rolling mill according to an embodiment of the present invention.

FIG. 1 diagrammatically shows the structure of a cold pilger rolling mill according to the invention as a side view. The rolling mill comprises a roll stand 1 having rolls 2, 3, a calibrated rolling mandrel 4 and a feed clamping saddle 5.

In the illustrated embodiment the cold pilger rolling mill has a linear motor identified by 6. The linear motor 6 forms a direct drive for the feed clamping saddle 5. The linear motor 6 is made up of a rotor 16 and a stator 17.

During cold pilgering on the rolling mill shown in FIG. 1 the tube shell 11 experiences a stepwise feed in a direction towards the rolling mandrel 4 or over same, while the rolls 2, 3 are horizontally reciprocated rotatingly over the mandrel 4 and thus over the tube shell 11. In that case the horizontal movement of the rolls 2, 3 is predetermined by a roll stand 1 to which the rolls 2, 3 are rotatably mounted. The roll stand 1 is reciprocated by means of a crank drive 21 in a direction parallel to the rolling mandrel 4 while the rolls 2, 3 themselves receive their rotary movement from a rack which is stationary relative to the roll stand 1 and into which engage gears fixedly connected to the roll shafts.

The feed of the tube shell 11 over the mandrel 4 is effected by means of the feed clamping saddle 5 which permits a translatory movement in a direction parallel to the axis of the rolling mandrel. The conically calibrated rolls 2, 3 arranged in mutually superposed relationship in the roll stand 1 rotate in opposite relationship to the feed direction of the feed clamping saddle 5. The so-called pilger mouth formed by the rolls engages the tube shell 11 and the rolls 2, 3 press a small wave of material away from the outside, the wave being stretched out by a smoothing caliber of the rolls 2, 3 and the rolling mandrel 4 to give an intended wall thickness until a clearance caliber of the rolls 2, 3 releases the finished tube. During the rolling procedure the roll stand 1 with the rolls 2, 3 mounted thereto moves in opposite relationship to the feed direction of the tube shell 11. After reaching the clearance caliber of the rolls 2, 3, the tube shell 11 is advanced by means of the feed clamping saddle 5 by a further step towards the rolling mandrel 4 while the rolls 2, 3 return with the roll stand 1 to their horizontal starting position. At the same time the tube shell 11 experiences a rotation about its axis to achieve a uniform shape for the finished tube. A uniform wall thickness and roundness for the tube and uniform inside and outside diameters are achieved by rolling over each tube portion a plurality of times.

A central procedural control system controls the initially independent drives of the roll mill so that the above-described procedure in the rolling process is achieved. Control begins with triggering a feed step of the linear motors 6 for advancing the tube shell 11. After the feed position is reached the linear motors 6 are actuated in such a way that they hold the feed clamping saddle 5 static. The rotary speed of the crank drive is so controlled that, simultaneously with the feed step of the linear motors 6, the roll stand 1 is moved back into its starting position while, after the conclusion of the feed step, the roll stand 1 is moved horizontally over the tube shell 11, in which case the rolls 2, 3 roll out the tube shell 11 afresh. When reaching the reversal point of the roll stand 1 the drive of the clamping chuck 12 is actuated in such a way that the tube shell 11 is rotated about the mandrel 4.

The arrangement of the linear motors 6, 7 on the feed clamping saddle 5 can be clearly seen in the cross-sectional view of an embodiment in FIG. 2. FIG. 2 shows the main frame structure 13 which forms the travel path for the feed clamping saddle 5 and to which four linear ball guides 14, 15 are connected. In this arrangement two of the linear guides 14 are arranged at the sides of the main frame structure while two further linear guides 15 are arranged upwardly on the main frame structure 13 so that they carry the vertical forces of the feed clamping saddle. The feed clamping saddle 5 itself engages around the main frame structure 13 in the manner of a U-shaped profile, wherein the limbs of the U-shaped profile are guided by the lateral linear guides 14 while the connecting portion between the limbs of the U-shaped profile rests on the upper linear guides 15.

To carry the tube shell 11 the feed clamping saddle 5 has a clamping chuck 12. In this case the clamping chuck is driven by motor means so that it permits rotation of the tube shell during the feed steps.

The linear motors 6, 7 are arranged at the lateral limbs of the U-shaped feed clamping saddle 5. Each of the linear motors 6, 7 has a respective stator 17 and a rotor 16. In this arrangement the stators 17 are stationarily connected to the main frame structure 13 of the guide path while the rotors 16 are connected to the limbs of the U-shaped feed clamping saddle 5. In that way the alternating electromagnetic field produced by the stators 17 pulls the rotors 16 along on the main frame structure 13 in the longitudinal direction. For the supply of power for the linear motors 6 through 9 and for the motor producing the rotary movement of the clamping chuck 12, a cable drag chain 18 for guiding the transition of the power supply cables from the stationary parts of the installation to the moving feed clamping saddle is arranged laterally on the latter.

FIG. 3 diagrammatically shows a side view of the feed clamping saddle 5 on the travel path main frame structure 13. It can be clearly seen that the main frame structure 13 has guide rails 19 which form the linear guides with the corresponding guides 20 fixed to the feed clamping saddle. The clamping chuck 12 arranged upwardly on the feed clamping saddle for carrying the tube shell can also be clearly seen as well as the third drive 22.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

LIST OF REFERENCES 1 roll stand
2, 3 rolls
4 rolling mandrel
5 feed clamping saddle
6, 7 linear motors
11 tube shell
12 clamping chuck
13 main frame structure
14, 15 linear guides
16 rotor
17 stator
18 energy guide chain
19 guide rails
20 guides
21 crank drive

The invention claimed is:

1. A cold rolling mill, comprising:
a reciprocating roll stand,
at least two calibrated rolls rotatably mounted to the roll stand,
a feed clamping saddle for feeding a blank, and
a first drive for the feed clamping saddle,
wherein the first drive has at least one direct electromechanical linear drive driving the feed clamping saddle without conversion of a rotary movement into a translational movement,
wherein the first drive also has a brake,
wherein the brake is a damping pneumatic or hydraulic system having a piston and a cylinder, wherein the piston or the cylinder is attached to the feed clamping saddle, wherein the damping pneumatic or hydraulic system acts in a direction parallel to a direction of the translational movement of the feed clamping saddle, and
wherein, in a static condition of the direct electromechanical linear drive in which a rotor is not moving relative to a stator, the damping pneumatic or hydraulic system receives forces which act on the feed clamping saddle and damps a movement of the feed clamping saddle in at least one translational direction.

2. A cold rolling mill as set forth in claim 1, wherein the cold rolling mill is a cold pilger rolling mill having:
a calibrated rolling mandrel and at least two calibrated rolls rotatably mounted to the roll stand,
a second drive for the roll stand, which moves the roll stand forward and back during the rolling process in the feed direction of the feed clamping saddle, and
a third drive which rotates a chuck connected to the feed clamping saddle about an axis parallel to the feed direction during the rolling process.

3. A cold rolling mill as set forth in claim 1, wherein the first drive has at least two direct electromechanical linear drives.

4. A cold rolling mill as set forth in claim 1, comprising a guide for the feed clamping saddle, wherein the guide has an electromagnetic linear guide.

5. A cold rolling mill as set forth in claim 1, wherein a second drive for the roll stand has a direct electromechanical linear drive.

6. A cold rolling mill as set forth in claim 1, wherein the cold rolling mill has a control which controls the drive for the feed clamping saddle, a drive for the roll stand and a drive which rotates a chuck in such a way that the rolling process is carried out on the mill.

7. A cold rolling mill as set forth in claim 1 wherein, in the static condition, the blank is in engagement between the rollers in a cold rolling operation.

8. A method of cold rolling a blank by means of a cold rolling mill including a reciprocating roll stand, at least two calibrated rolls rotatably mounted to the roll stand, a feed clamping saddle for feeding the blank, and a first drive for the feed clamping saddle, the method comprising:
stepwise feeding the blank in a first direction to the at least two calibrated rolls, wherein feeding is implemented by means of the first drive for the feed clamping saddle for feeding the blank, and wherein the first drive comprises at least one direct electromechanical linear drive and a brake and the at least one direct electromechanical linear drive drives the feed clamping saddle without conversion of a rotary movement into a translational movement;
between steps of the stepwise feeding of the blank, preventing a translatory movement of the blank in a second direction by the brake, wherein the second direction is opposite to the first direction;
wherein the brake is a damping pneumatic or hydraulic system having a piston and a cylinder, wherein the piston or the cylinder are attached to the feed clamping saddle, and wherein the damping pneumatic or hydraulic system acts in a direction parallel to a direction of the translational movement of the feed clamping saddle; and
in a static condition of the direct electromechanical linear drive in which a rotor is not moving relative to a stator, receiving forces which act on the feed clamping saddle by the damping pneumatic or hydraulic system and preventing a translatory movement of the feed clamping saddle by the brake.

9. A method of cold rolling as set forth in claim 8, wherein, in the static condition, the blank is in engagement between the rollers in a cold rolling operation.

* * * * *